March 20, 1945. W. FEW 2,371,981
TIME DELAY SYSTEM
Filed May 2, 1942 2 Sheets-Sheet 1

Inventor
William Few
By Harry P. Canfield
Attorney

March 20, 1945.  W. FEW  2,371,981
TIME DELAY SYSTEM
Filed May 2, 1942  2 Sheets-Sheet 2
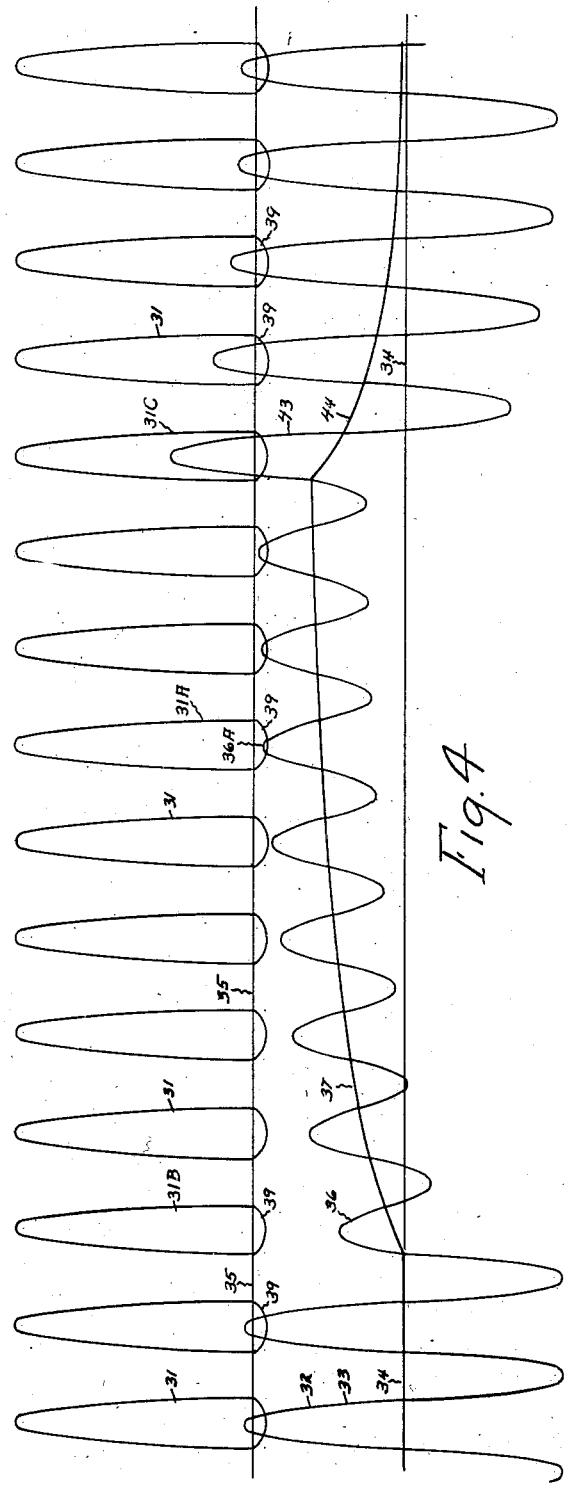
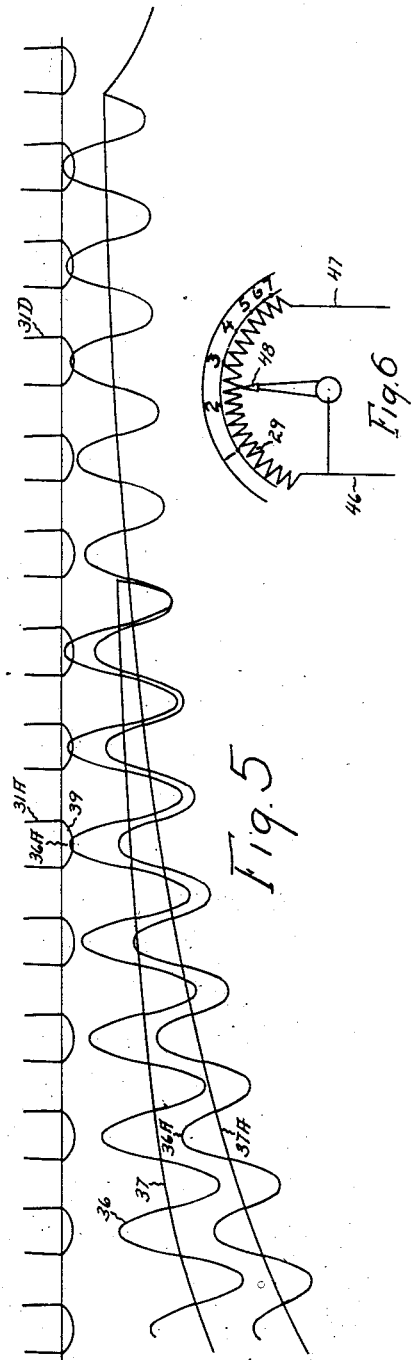
Inventor
William Few
By Harry P. Canfield
Attorney Patented Mar. 20, 1945

2,371,981

UNITED STATES PATENT OFFICE 2,371,981

TIME DELAY SYSTEM

William Few, Cleveland, Ohio, assignor to The Clark Controller Company, Cleveland, Ohio, a corporation of Ohio Application May 2, 1942, Serial No. 441,555

15 Claims. (Cl. 250—27)

This invention relates to electronic timing systems of the type in which, upon the closing of a control circuit, a time period elapses at the end of which a work circuit or circuit to be controlled is automatically energized.

The underlying principles of the invention may be variously embodied, but the particular embodiment thereof chosen for illustrative purposes herein comprises among other features the following. The system is an alternating current system. The circuit to be controlled or timed includes the winding of an electro-magnetic relay and the anode and cathode of an electronic tube which latter are under the control of a tube grid. A timing condenser is connected to the grid and is normally charged and energizes the grid at the polarity which inhibits the tube; that is to say, it normally prevents the flow of cathode to anode current in the relay winding circuit. (Current flow herein is considered as in the direction of the flow of the electrons.) Upon closing a control circuit by a control contactor, the condenser begins to discharge at a retarded rate and at the end of a time period it no longer energizes the grid sufficiently to inhibit the tube and cathode-anode current then flows energizing and operating the relay and maintaining it operated so long as the control circuit contactor is maintained closed. The relay energizing circuit may itself be considered as the work circuit, or contacts on the relay may be provided to control extraneous load circuits as will be understood.

Timing systems of this general type have heretofore been proposed but have had certain objections and defects among which are the following.

The grid potential, which as stated is derived from the diminishing potential of the discharging condenser, may reach the tube firing value sometimes at an earlier and sometimes at a later point in the half wave of the alternating potential impressed on the anode and cathode, or it may reach the tube firing value at an earlier or later half wave, so that the total time interval of the system represented by the number of half waves between the time the condenser starts to discharge and the time of firing, varies and is not accurately predeterminable.

Again in prior systems of this type, the condenser discharge circuit is customarily closed to start the time interval by a contactor, which for practical convenience is sometimes located remotely from the timing apparatus and connected to it by conductors, and some of the charge leaks out through these conductors, and since the leakage is variable because of extraneous variable conditions, the discharge rate of the condenser is different at different times and the time period accordingly varies and is not accurately predeterminable.

Again, prior systems of this type are subject to the objection that after the condenser has discharged to time one interval, a lapse of time must be allowed for it to charge again preparatory for timing another interval, this lapse of time being recognized and referred to as a "re-setting" time. Besides the delay between timed intervals which this imposes, there is another disadvantage. The starting of succeeding time intervals is sometimes under the control of an operator's contactor and the operator may not wait for the resetting interval to elapse and for the condenser to become fully charged, and by such premature operation of the contactor he will cause the timing apparatus to time a shorter interval than that for which it was adjusted.

Again in such prior systems, the adjustment of the time interval is effected by annually adjusting the capacity of the timing condenser, or by adjusting a resistance in the system, by adjusting means having an indicating dial scale. Such adjustment cannot in any case be made with absolute accuracy, a percentage of error being usually to be expected; but such adjustments as heretofore provided introduce a greater percentage of error at one portion of the scale than at another, so that the unavoidable error in adjusting the time interval is variable, and adjustment of the time interval cannot be satisfactorily effected.

It is among the objects of the present invention:

To provide a timing system of the general type referred to in which the foregoing objections to such systems as heretofore devised are obviated.

Other objects are, to provide a timing system of the type referred to in which improvements are effected: by causing the firing of the tube to occur at a steeper portion of the discharge curve of the timing condenser (that is while the condenser charge changes more rapidly), than has heretofore been possible; and by causing the timing condenser to be re-charged immediately at the end of each time interval which it times by its discharge, and without thereby again inhibiting the tube and stopping the current flow; and by causing the adjustment of the time interval to be made by an adjustment means having a logarithmic dial scale; and by causing the said resetting time to be reduced to the minimum. These and other improvements and objects and the means by which they are accomplished will become clear hereinafter.

My invention is fully disclosed in the following description taken in connection with the accompanying drawings in which, Fig. 1 is a diagrammatic view illustrating an embodiment of my invention;

Fig. 4 is a diagrammatic view illustrating certain potential and current conditions occurring in the operation of the embodiment of Fig. 1;

Fig. 5 is a view similar to a part of Fig. 4 to a different scale and illustrating the effects of an adjustment feature of Fig. 1;

Fig. 6 is a fragmentary view illustrating in more detail the adjusting rheostat shown diagrammatically in Fig. 1.

It is to be borne in mind that in systems of this general type as heretofore proposed, when the condenser is fully charged, the tube grid energized thereby inhibits the tube and prevents cathode-anode current from flowing in the work circuit, but that after the condenser charge has been diminished to time a timer interval and then ceases inhibiting the tube, half waves of current begin to flow in the work circuit. It is usually desirable to keep the work circuit current flowing for a time after it starts. Therefore (in the absence of other provisions) the condenser cannot be recharged for timing the next interval until after the work circuit current has been interrupted, because recharging the condenser would again inhibit the tube and stop current. Thus (in the absence of other provisions) after the work circuit current has been cut off, a "resetting" time interval must be allowed to elapse to give the condenser time to charge to its inhibiting value before another time interval can be timed. In the system hereindescribed, means is provided by which the condenser can, nevertheless, be immediately recharged after it discharges and without thereby inhibiting the tube and stopping the work circuit current flow, whereby the resetting time is obviated with the advantages mentioned hereinbefore.

Figure 1:
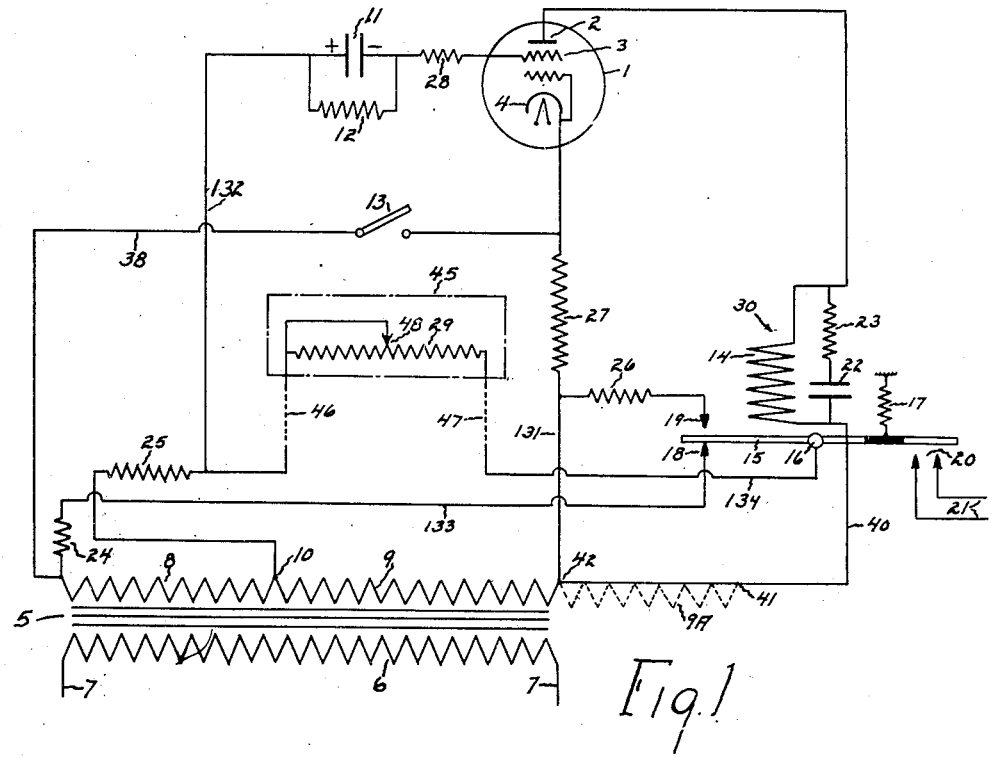

In Fig. 1 of the drawings is shown at 1 an electronic tube, preferably of the gas filled type, and having an anode 2, a control grid 3 and a cathode 4, the cathode being of the heated type, and the tube being a rectifier type tube. A suitable tube is the commercial R. C. A. 2050 or 2051.

At 5 is a transformer, having a primary 6 connected to a supply of alternating potential by wires 7—7, and having a secondary which may conveniently be considered in two parts 8 and 9, determined by a tap connection at 10. Suitable potentials for the secondaries 8 and 9 are 70 volts and 80 volts respectively.

At 11 is the timing condenser, and at 12 is a discharging resistance connected permanently in parallel therewith, a suitable capacity value for the condenser being 1 microfarad and a suitable resistance for the unit 12 being two megohms.

At 13 is the operator's contactor referred to.

At 14 is the winding of a magnetic relay, diagrammatically illustrated, and comprising a contact arm 15 pivotally supported at 16, and normally rocked around the pivot by a spring 17 to engage, in normally closed condition, a contact 18. At 19 is a contact, normally disengaged. At 20 are normally open contacts, which are closed by rocking of the arm 15 to close an extraneous work circuit 21.

The winding 14 is bridged by a hold-over condenser 22 and a resistor 23 in series therewith, for the usual purpose of keeping the winding 14 energized during the half wave periods when no cathode-anode current is flowing.

A suitable capacity value for the condenser 22 is one microfarad and a suitable value for the resistance unit 23 is 500 ohms.

Other resistance units are shown in Fig. 1 having suitable resistance values as follows: a unit 24 of 250 ohms; a unit 25 of 2500 ohms; a unit 26 of 750 ohms; a unit 27 of 7500 ohms; a unit 28 of 5,000 ohms; and an adjustable unit 29 of 10,000 ohms.

The various circuit connections of the system not thus far described will now be described in connection with a description of its operation as a whole.

Figure 2:
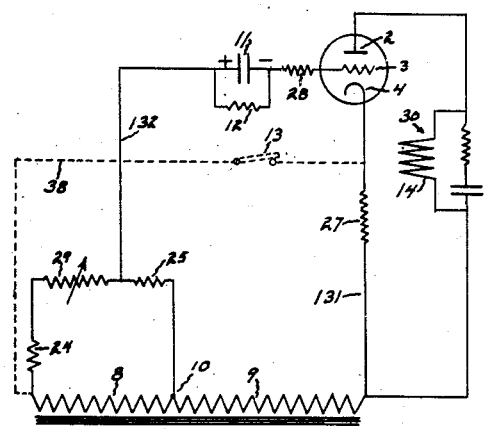
Figs. 2 and 3 are views supplemental to Fig. 1 illustrating respectively parts of Fig. 1 in simplified form as certain changes in the circuit connections of Fig. 1 are made in the operation thereof.
Figure 3:
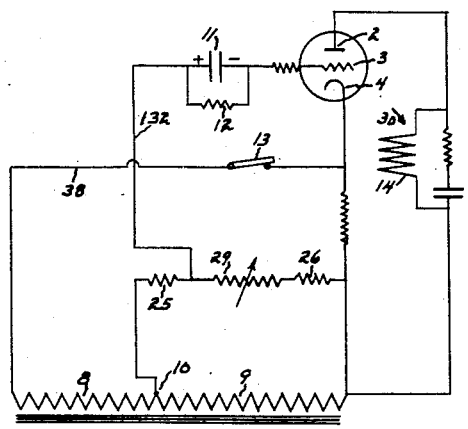

This description may be read with reference to Fig. 1 showing the entire system, and for greater convenience and clearness and description may also be read in connection with Figs. 2 and 3, Fig. 2 in solid line illustrating the functioning parts of the system by which the timing condenser 11 is charged and maintained charged awaiting the timing of a time interval; and the dotted line parts of Fig. 2 illustrating additionally the functioning parts of the system when the operator's contactor has first been closed and the time interval prior to firing of the tube is running; and Fig. 3 illustrating the functioning parts of the system after the tube has fired and the relay, shown generally at 30 Fig. 1, has operated and the timing condenser recharges.

Assuming that the operator's contactor 13 is open and that the transformer primary 6 is connected to a suitable source of alternating potential, the timing condenser 11 is brought up to charge and maintained charged by the potential of the transformer secondary 9, plus the potential drop across the resistance unit 25, the charging current flowing from the right hand end of the secondary 9, by wire 131, through the resistance unit 27, to the tube cathode 4, to the grid 3, through the resistance unit 28, through the condenser 11, by wire 132, to and through the resistance unit 25, to the tap connection 10.

As to the potential drop through the resistance unit 25, it will be observed that a loop, see Fig. 2, comprising the resistance units 24, 29 (adjustable), and 25, is connected across the secondary 8, as shown; this loop, as in Fig. 1, including a wire 133, contact 18, arm 15, and a wire 134. The current flowing in this loop under the impulsion of the potential of the secondary 8, causes potential drop in each of the three resistance units of which the unit 25 is one, and the potential drop through the unit 25 is added to the potential of the secondary 9 to constitute the charging voltage as described.

It is assumed for the present discussion that the resistor 29 is adjusted to have one half of it in the circuit; and with the values given above, the charging voltage will therefore be approximately 102 volts (effective value).

In this charging circuit the grid 3 is negative with respect to the cathode 4, and the charged condenser maintains it negative as indicated by the polarity thereof in the drawings, so that when potential is impressed upon the cathode and anode, as will presently appear, the grid will inhibit the tube.

This is shown graphically in Fig. 4. In that figure, the train of half waves 31—31 represents the half waves of potential which will be available to cause cathode-anode current to flow in the relay winding circuit; the wave 32 represents the above-mentioned alternating current impressed upon the cathode 4 and grid 3 for charging the condenser 11, the half waves 33—33 only above the line 34 supplying charging current because of the rectifier action of the tube between the cathode and grid. The line 34 represents the potential of the charged condenser, the left hand end of the figure showing the conditions at a time when the condenser is charged.

The peaks of the potential waves 33—33, as shown, rise slightly above the base line 35 of the waves 31—31, and each half wave 33 of charging potential supplies charging current to the condenser 11 to compensate for the leakage therefrom occurring through the resistor 12, the ordinate distance of the line 34 from the line 35 representing the potential of the charged condenser. The line 34 is represented as a straight line for simplification it being understood by those skilled in the art that it will not be rectilinear because of the cyclical input of condenser current and leakage therefrom through the resistor 12, the line 34 therefore representing the average of the condenser potential when fully charged.

The condenser thus being charged as stated, it will be assumed that the contactor 13 is now closed to start the running of a time interval. As shown in both Figs. 1 and 2, and particularly by the dotted line part of Fig. 2, closure of the contactor 13 connects the cathode 4 of the tube to the left hand end of the secondary 8—9. The right hand end of the secondary 8—9 is already connected through the winding 14 of the relay 30 to the anode 2 of the tube, so that the full potential of the transformer is impressed across the anode and the cathode of the tube preparatory to causing half waves of current to flow through the tube and relay winding, but this flow is temporarily inhibited by the negative potential on the grid 3 from the charged condenser.

The closing of the contactor 13 also causes the impressed potential between the cathode 4 and grid 3 to be of reduced value, namely that shown by the wave 36, Fig. 4 which is insufficient to keep the condenser charged so that it discharges through its resistor 12. This potential wave 36 furthermore is superimposed upon the discharging potential of the condenser. In Fig. 4, the discharging potential of the condenser is represented by the line 37, but with the alternating potential 36 superimposed thereon, the discharging potential being in fact represented by the wave 36; and this being the potential of the grid 3.

This superimposed potential 36 is provided as follows with reference to Figs. 1 and 2. The loop comprising the resistors 24, 29 and 25 is still connected across the secondary 8, and the voltage of the secondary 8 drops through these three resistors. Upon closing the contactor 13 however, a direct connection is made from the cathode 4 to the left hand end of the transformer secondary by the wire 38. The potential across the cathode and grid is now therefore only that due to the drop through the resistors 24 and 29. The circuit may be considered as traced from the left hand end of the secondary 8, by wire 38, through contactor 13, to the cathode 4, to grid 3, through the condenser 11, and by wire 132 through the resistors 29 and 24. With the resistor 29 adjusted to one half its value, the potential thus provided will be approximately 47 volts.

Referring to Fig. 4 again, the potential on the grid 3 being represented by the wave 36, it will be observed that the peaks of the wave 36 approach closer and closer to the curves 39 associated with each potential wave 31, the curves 39 representing the characteristic of the tube, that is to say, the minimum negative potential of the grid 3 which will inhibit the tube. At the potential wave 31A a peak of the wave 36 as shown at 36A crosses the curve 39 and therefore the tube fires.

The time interval referred to is represented by the number of half waves during which the condenser was discharging, and in Fig. 4 this is represented by the number of half waves between the half wave 31B and the half wave 31A. In practice there will probably be a greater number of half waves than those illustrated but a small number has been illustrated to confine the showing to a single linear diagram.

When the tube fires as described on the half wave 31A of Fig. 4, current flows through the relay winding 14, under the impulsion of the potential of both secondaries 8 and 9, and the current may be traced from the left hand end of the secondary 8, by wire 38 through contactor 13, to the cathode 4, to the anode 2, through the winding 14 and back to the right hand end of the secondary 9.

If desired, a greater potential than this may be made available to operate the relay and this has been indicated by the dotted line portion 9A of the secondary, that is to say, the wire 40 leading from the lower end of the winding 14 to the transformer may be connected to the additional secondary portion 9A at the point 41 instead of being connected to the secondary 9 at the point 42.

The inertia of the parts of the relay 30 may prevent its operation on the first half wave, 31A, and a few half waves of current may flow before it operates sufficiently to break contact at the closed contact 18 and make contact at the open contact 19, and this is represented in Fig. 4 by the half waves between the wave 31A and the wave 31C.

When the relay does fully operate however as at the wave 31C of Fig. 4 and shifts the contact connections referred to, it remains operated so long as the contactor 13 remains closed, and the condenser is immediately subjected to a charging potential which after a few half cycles brings it up again to full charge but without thereby inhibiting the tube, this action being referred to herein as "re-charging" the condenser; and the circuits therefor may be traced in either Fig. 1 or Fig. 3.

Shifting of the contacts 18 and 19 by the relay now throws a loop across the secondary 9 comprising the resistors 25, 29 and 26. The potential of the secondary 9 therefore drops through these three resistors of which the resistor 25 is one. Potential is impressed upon the condenser charging circuit comprising the potential of the secondary 8 plus the drop through the resistor 25. The circuit may be traced from the left hand end of the secondary 8, by the wire 38 through the contactor 13 to the cathode 4, thence to the grid 3, thence through the condenser, and by wire 132, through the resistor 25, to the tap point 10. With the resistor 29 still in its half value adjusted condition, this potential will be approximately 94 volts (effective).

This potential is represented by the wave 43 in Fig. 4 and the potential of the charging condenser, or the average thereof is represented by the rising potential line 44.

This recharging potential (94 volts effective) is slightly less than the charging potential (102 volts effective) described hereinbefore; and is made so because the tube is passing main current between the cathode and anode, and therefore the voltage drop between the cathode and grid through which the charging current is flowing is now less.

As shown in Fig. 4, the peaks of the recharging potential 43 cross and go above the characteristic curves 39 of each of the half waves beginning with and subsequent to the half wave 31C, at which latter the recharging began, so that these peaks cause the tube to keep firing on each successive half wave. As shown in Fig. 4, the condenser potential 44 approaches the full charge value represented by the line 34 and ultimately will attain full charge at a point outside the limits of the drawing but even at full charge the peaks of the recharging potential 43 cross the characteristic lines 39 and cause the tube to fire on each half wave notwithstanding that the condenser becomes fully charged.

In this connection it may be stated that at the left hand end of Fig. 4 while the potential wave 32 was keeping the condenser charged, and although the peaks of the half waves 33 of this potential cross the characteristic curve 39 of the tube, the tube did not fire because, the contactor 13 being open, there was no potential impressed upon the cathode and anode of the tube, see Figs. 1 and 2.

If now the contactor 13 be opened again, the potential across the cathode and anode is removed and the tube stops firing for that reason. Since the recharging potential on the condenser recharges it very quickly it will, in all practical uses of the system, be fully charged when the contactor 13 is opened, or, if not fully charged, will very quickly come up to full charge, because opening of the contactor 13 and the consequent restoring of the relay contacts 18 and 19 to their original condition subjects the condenser to the original charging potential of the wave 32 as described in connection with Figs. 1 and 2. The so-called "re-setting" time is therefore completely eliminated or reduced to a negligibly small time.

We may consider now the adjustment of the time interval, in connection with Fig. 5. The condenser discharge curve 37, and the potential 36 superimposed thereon, are here reproduced from Fig. 4, and the peak of the resultant discharge wave 36 fires the tube on the half wave 31A, by being above the characteristic curve 39 as at 36A, in Fig. 4. It will be understood that the circuit is in the condition of Fig. 2 with the contactor 13 closed, and the adjustable resistor 29 adjusted to say it middle position.

As described above, the potential to which the condenser was charged was determined by the sum of the potentials of the secondary 9 and the drop through the resistor 25.

If now the resistor 29 be adjusted to include less of its resistance in the loop 24—29—25, see Fig. 2, then there will be more drop through the resistor 25, and the charging potential on the condenser will be greater and its charge will be greater, so that when it begins to discharge it will discharge along a line represented by 37A in Fig. 5, which as shown has greater ordinate values than the discharge line 37.

Concurrently, when the contactor 13 is closed, and the condenser begins to discharge with alternating potential superimposed thereon, the amplitude of this alternating potential will be correspondingly lower as represented by the curve 36A (as compared with the potential 36) and this results from the fact that this superimposed potential was derived from the drop through the resistors 24 and 29, and the drop through the resistor 29 is now less than it was before.

It will thus be seen that adjusting the resistor 29 (say to reduce its effective resistance) has the joint effect of changing the value of the charge on the condenser (to increase it) and of changing the amplitude (to reduce it) of the wave superimposed upon the condenser curve. Both of these effects operate to change the time interval. For example in Fig. 5, the condenser charge being higher as indicated by the discharge line 37A and the amplitude of the imposed potential being less as indicated by the curve 36A, the tube will fire on the half wave 31D instead of on the wave 31A.

Thus the time interval of the system as described may be adjustably varied over a wide range by the adjustment of the amount of resistance of the resistor 29 in the circuit.

In some cases it may be desirable to adjustably control the timed interval, from a position remote from the rest of the system and the means for doing this is indicated in Fig. 1 where the adjusting resistor 29 is shown as in a unit 45 connected to the system by wires 46 and 47 which may be of any desired length as indicated by the dotted line showing of these wires. Since the rate of discharge of the condenser 11 occurs solely through the resistor 12 permanently connected across it, its rate of discharge for any given initial charge will always be the same. In prior systems, the time interval has been adjusted by adjusting the value of a resistor corresponding to the resistor 12, and when remote control has been wanted, the resistor (12) has been disposed remotely with respect to the condenser; and variable leakage between the wires connecting the resistor 12 to the condenser, due to variable extraneous conditions, has in such systems caused the discharge time of the condenser to vary. Such variations of the time interval have been reduced to a negligible minimum in the present system by the arrangement described, because even if the wires 46 and 47 be of relatively great length and disposed close together so that leakage between them might occur, such leakage has a negligible effect upon the time interval because the resistor 29 functions by the drop of potential across its terminals.

Adjustment of the time interval therefore is made by adjusting the resistor 29. As in common practice, adjustment of this resistor would preferably be made in connection with an indicating dial scale. In Fig. 6 is illustrated the resistor in connection with such a dial scale, and this figure also illustrates another advantage of my invention, namely, that the time interval adjusting scale may be a logarithmic scale. The scale is indicated by the numbers 1 to 7 just outside of the resistor 29. (No attempt has been made to make this scale accurately logarithmic in the drawings, but its logarithmic character is indicated by the decreasing distances between adjacent numbers of the scale as they proceed from 1 upwardly.)

The ohmic resistance of the resistor 29 is preferably uniform for equal lengths thereof from end to end. The numbers of the scale indicate the time interval of the system for different positions of the contact 48. In setting any kind of a dial to a point on a scale, particularly when done manually, a certain amount of error is to be expected. But it is an obvious advantage to have such error produce at all parts of the scale the same percentage of error in the end result. It is well-known that with a resistor uniform from end to end and for a logarithmic scale to indicate the amount of resistance in the circuit, equal linear errors in the setting of the dial to vary the resistance produce equal percentages of error in the total amount of resistance in the circuit. With a resistor such as the resistor 29 connected in the circuit as described above, the positions to which the contact 48 must be moved to change the time interval by equal amounts (for example seconds) will correspond to points on a logarithmic scale. The aforesaid advantages of the logarithmic scale may therefore be enjoyed with the type of interval control herein disclosed.

My invention is not limited to the exact details of the circuits illustrated and described. Changes and modifications may be made within the spirit of my invention without sacrificing its advantages and my invention comprehends all such changes and modifications which come within the scope of the appended claims.

I claim:

1. In an interval timing arrangement, a source of alternating potential, an electronic tube having principal electrodes and having a control grid, a work circuit comprising the principal electrodes, a timing condenser connected to the grid and normally maintained charged by cathode-grid current from source-derived potential to a tube inhibiting value, means to subject the work circuit to source derived potential and to initiate discharge of the condenser and after a time interval of discharging to cause the tube to fire and energize the work circuit, and means to recharge the condenser by cathode-grid current concurrently with continued energization of the work circuit.

2. In an interval timing arrangement, a source of alternating potential, a work circuit, an electronic tube having principal electrodes in the work circuit and having a control grid, a timing condenser connected to the grid, means to normally charge the condenser by cathode-grid current from source-derived potential to a tube inhibiting value, switch means and circuit means controlled thereby to impress upon the work circuit source-derived potential and to initiate discharge of the condenser to cause the tube, after a time interval of discharging, to fire on successive half waves of impressed potential and energize the work circuit, and means to recharge the condenser to said value by cathode-grid current concurrently with continued firing of the tube.

3. In an interval timing arrangement, a source of alternating potential, a work circuit, an electronic tube having principal electrodes in the work circuit and having a control grid, a timing condenser connected to the grid, means to normally maintain the condenser charged by cathode-grid current from source-derived potential to a tube inhibiting value, switch means and circuit means controlled thereby to impress source-derived potential upon the work circuit, and to initiate discharge of the condenser, and to superimpose source derived alternating potential on the condenser potential to cause the tube, after a time interval of condenser discharging, to fire on successive half waves of the impressed potential and energize the work circuit, the superimposed potential being phased to cause the tube to begin to fire substantially at a peak thereof and means to increase the amplitude of the superimposed potential to cause it to recharge the condenser to said value by cathode-grid current, concurrently with continued firing of the tube.

4. In an interval timing arrangement, a source of alternating potential, a work circuit, an electronic tube having principal electrodes in the work circuit and having a control grid, a timing condenser connected to the grid, means to normally charge the condenser from source-derived potential to a tube inhibiting value, switch means and circuit means controlled thereby to impress source-derived potential upon the work circuit, and to initiate discharge of the condenser, and to superimpose source-derived alternating potential on the condenser discharging potential to cause the tube, after a time interval of condenser discharging, to fire on successive half waves of the impressed potential and energize the work circuit, the superimposed potential being phased to cause the tube to fire at a peak thereof, and means to increase the amplitude of the superimposed potential to cause it to recharge the condenser to said value concurrently with continued firing of the tube.

5. In an interval timing arrangement, a source of alternating potential, a work circuit, an electronic tube having principal electrodes in the work circuit and having a control grid, a timing condenser connected to the grid, a discharging circuit for the condenser, a transformer energized from the source and having two secondaries, a loop of adjustable resistance connected across one secondary, a first circuit for charging the condenser by grid current energized by the potential of the other secondary and by a part of the potential drop in the loop and means responsive to energization of the work circuit for connecting a second loop of adjustable resistance across the other secondary and for recharging the condenser concurrently with energization of the work circuit by the potential of the one secondary and a part of the drop in the second loop.

6. In an interval timing arrangement, a source of alternating potential, a work circuit, an electronic tube having principal electrodes in the work circuit and having a control grid, a normally charged timing condenser connected to the grid, a transformer energized from the source and having a secondary, means to initiate discharge of the condenser, circuit means to energize the work circuit through the principal electrodes of the tube from secondary-derived potential, after a time interval of condenser discharging, a loop of adjustable resistance connected across a part of the secondary, a recharging circuit for recharging the condenser concurrently with continued energization of the work circuit, energized by the potential of another part of the secondary and by a part of the potential drop in the loop, and means responsive to energization of the work circuit to close the recharging circuit.

7. In an interval timing arrangement, a source of alternating potential, a work circuit, an electronic tube having principal electrodes in the work circuit and having a control grid, a normally charged timing condenser connected to the grid, a transformer energized from the source and having a secondary, means to initiate discharge of the condenser, circuit means to energize the work circuit through the principal electrodes of the tube from source-derived potential after a time interval of condenser discharging, a loop of adjustable resistance connected across a part of the secondary, a recharging circuit for recharging the condenser concurrently with continued energization of the work circuit energized by the potential of another part of the secondary and by a part of the potential drop in the loop, and means responsive to energization of the work circuit to close the recharging circuit, the adjustable resistance of the loop comprising a rheostat whose movable element of which is provided with a dial and a logarithmic dial-position indicating scale.

8. The method of timing successive intervals with a condenser and a three element electronic tube having its principal electrodes in a work circuit, without introducing a condenser recharging interval, which includes: charging the condenser, impressing alternating potential upon the principal electrodes of the tube, subjecting the grid of the tube to the discharging potential of the condenser to cause the tube to fire and pass current to the work circuit on successive half waves of the impressed potential after a time interval of condenser discharging, and then immediately recharging the condenser preparatory to timing the next succeeding interval, by an alternating recharging potential applied to the condenser through the grid circuit concurrently with flow of current in the work circuit, and so phased with respect to the impressed potential that the energization of the grid thereby causes the tube to continue to fire on successive half waves and continue to pass current to the work circuit while the condenser is recharging.

9. In an interval timing arrangement, a source of alternating potential, an electronic tube having principal electrodes and having a control grid, a work circuit comprising the principal electrodes, a timing condenser permanently connected to the grid and normally maintained charged by source-derived potential to a value which normally inhibits the tube control means and circuit means controlled by operation of the control means to initiate discharge of the condenser and subject the work circuit to source derived potential and after a time interval of discharging to cause the tube to fire and energize the work circuit and maintain it energized so long as the control means is maintained operated, and to cause the condenser to recharge concurrently with continued energization of the work circuit.

10. In an interval timing arrangement, a source of alternating potential, a work circuit, an electronic tube having principal electrodes in the work circuit and having a control grid, a timing condenser permanently connected to the grid, means to normally charge the condenser from source-derived potential to a tube inhibiting value, switch means and circuit means controlled thereby upon operation of the switch means to impress upon the work circuit source-derived potential and to initiate discharge of the condenser to cause the tube, after a time interval of discharging, to fire on successive half waves of impressed potential and energize the work circuit, and means to recharge the condenser to said value concurrently with continued firing of the tube, actuated by said operation of the switch means.

11. In an interval timing arrangement, a source of alternating potential, a work circuit, an electronic tube having principal electrodes in the work circuit and having a control grid, a timing condenser connected to the grid, means to maintain the condenser normally charged from source-derived potential to a value which normally inhibits the tube, switch means and circuit means controlled by operation of the switch means to impress source-derived potential upon the work circuit, and to initiate discharge of the condenser, and to superimpose source-derived alternating potential on the condenser discharging potential to cause the condenser discharge potential to be of wave form and to cause the tube, after a time interval of condenser discharging, to fire on all successive half waves of the impressed potential and energize the work circuit and maintain it energized so long as the switch means is maintained operated, the superimposed potential being phased to cause the tube to fire at peaks of the discharging wave form potential, and means responsive to energization of the work circuit to increase the amplitude of the superimposed alternating potential to cause the condenser to recharge to said value concurrently with continued firing of the tube and continued energization of the work circuit.

12. In an interval timing arrangement, a source of alternating potential, a work circuit, an electronic tube having principal electrodes in the work circuit and having a control grid, a timing condenser connected at one side to the grid, and bridged by a discharge resistor, a transformer energized from the source and having a secondary, a resistance-containing loop bridging a part of the secondary, a connection from the other side of the condenser to an intermediate point of the resistance of the loop, control contacts, circuit means effective with the control contacts in normal condition to impress secondary-derived charging potential upon the condenser, determined in value by the potential drop in a part of the loop and effective upon operation of the contacts to impress secondary potential on the work circuit and to superimpose a reduced alternating potential on the condenser derived from the secondary and determined by the potential drop in another part of the loop, to cause the condenser discharge potential to be of wave form and to fire the tube on a peak of the wave.

13. In an interval timing arrangement, a source of alternating potential, a work circuit, an electronic tube having principal electrodes in the work circuit and having a control grid, a timing condenser connected at one side to the grid, and bridged by a discharge resistor, a transformer energized from the source and having a secondary, a resistance-containing loop bridging a part of the secondary, a connection from the other side of the condenser to an intermediate point of the resistance of the loop, control contacts, circuit means effective with the control contacts in normal condition to impress secondary-derived charging potential upon the condenser, determined in value by the potential drop in a part of the loop and effective upon operation of the contacts to impress secondary potential on the work circuit and to superimpose a reduced alternating potential on the condenser derived from the secondary and determined by the potential drop in another part of the loop, to cause the condenser discharge potential to be of wave form and to fire the tube on a peak of the wave, means to adjust the resistance in the said other part of the loop comprising a movable element and a logarithmic position indicating scale therefor.

14. In an interval timing arrangement, a source of alternating potential; a work circuit; an electronic tube having principal electrodes in the work circuit and having a control grid; a timing condenser connected to the grid bridged by a discharge resistance; a transformer secondary energized from the source and comprising two parts; a first resistance-containing loop normally connected across one secondary part; a circuit normally maintaining the condenser charged to a tube inhibiting value, energized by the other secondary part and by a portion of the potential drop through the loop; an operable contactor and circuit means controlled by operation of the contactor to subject the work circuit to the potential of the transformer secondary and to initiate discharge of the condenser and to superimpose on the condenser discharging potential an alternating potential phased with the secondary potential to cause the tube to fire and energize the work circuit at a peak of the discharging potential, after a time interval of condenser discharging, and to maintain the work circuit energized so long as the contactor is maintained operated; a second resistance loop; control means operable responsive to energization of the work circuit and circuit means controlled thereby to disconnect the first loop and to connect the second loop across the other secondary part and to recharge the condenser, concurrently with continued energization of the work circuit, by potential of the said one transformer part and a portion of the potential drop through the second loop.

15. In an interval timing arrangement, a source of alternating potential; a work circuit; an electronic tube having principal electrodes in the work circuit and having a control grid; a timing condenser connected to the grid bridged by a discharge resistance; a transformer secondary energized from the source and comprising two parts; a first resistance-containing loop normally connected across one secondary part; a circuit normally maintaining the condenser charged to a tube inhibiting value, energized by the other secondary part and by a portion of the potential drop through the loop; an operable contactor and circuit means controlled by operation of the contactor to subject the work circuit to the potential of the transformer secondary and to initiate discharge of the condenser to cause the tube to fire and energize the work circuit after a time interval of condenser discharging, and to maintain the work circuit energized so long as the contactor is maintained operated; a second resistance loop; control means operable responsive to energization of the work circuit and circuit means controlled thereby to disconnect the first loop and to connect the second loop across the other secondary part and to recharge the condenser, concurrently with continued energization of the work circuit, by potential of the said one transformer part and a portion of the potential drop through the second loop.

WILLIAM FEW.